United States Patent [19]

Bernau et al.

[11] Patent Number: 5,753,852
[45] Date of Patent: May 19, 1998

[54] GAS GENERATOR

[75] Inventors: Klaus Bernau, Soyen; Harald Seidel, Neunkirchen, both of Germany

[73] Assignee: TEMIC Bayern-Chemie Airbag GmbH, Aschau, Germany

[21] Appl. No.: 804,568

[22] Filed: Feb. 24, 1997

Related U.S. Application Data

[63] Continuation of Ser. No. 532,224, Sep. 22, 1995, abandoned.

[30] Foreign Application Priority Data

Sep. 23, 1994 [DE] Germany .......................... 44 33 935.6

[51] Int. Cl.$^6$ .................. B60K 21/26; C06D 5/00
[52] U.S. Cl. .................. 102/530; 60/632; 280/741
[58] Field of Search ................ 102/434, 467, 102/469, 530, 531; 60/632; 280/736, 737, 741; 411/508, 908; 422/164–166

[56] References Cited

U.S. PATENT DOCUMENTS

| | | | |
|---|---|---|---|
| 189,069 | 3/1877 | Smith | 102/469 |
| 2,979,896 | 4/1961 | Perkins, Jr. et al. | 102/531 |
| 3,144,827 | 8/1964 | Boutwell | 102/530 |
| 3,238,067 | 3/1966 | Brooks | 102/530 |
| 3,529,548 | 9/1970 | Gawlick | 102/531 |
| 3,715,131 | 2/1973 | Hurley et al. | |
| 3,934,984 | 1/1976 | Marlow et al. | 280/741 |
| 4,796,912 | 1/1989 | Lauritzen et al. | 102/530 |
| 4,819,562 | 4/1989 | Bownan | 102/281 |
| 4,920,885 | 5/1990 | Bowman et al. | 102/281 |
| 4,929,505 | 5/1990 | Washburn et al. | 411/508 |
| 4,938,145 | 7/1990 | Martwich | 102/434 |
| 5,143,500 | 9/1992 | Schuring et al. | 411/508 |
| 5,271,588 | 12/1993 | Doyle | 411/508 |
| 5,273,722 | 12/1993 | Hogenauer et al. | 280/741 |
| 5,366,239 | 11/1994 | Headley . | |
| 5,380,039 | 1/1995 | Emery et al. | 280/741 |
| 5,492,065 | 2/1996 | Jena et al. | 102/531 |

FOREIGN PATENT DOCUMENTS

| | | |
|---|---|---|
| 0 359 902 | 3/1990 | Germany . |
| 4102275 | 6/1992 | Germany . |
| 4135299 | 4/1993 | Germany . |
| 4208844 | 9/1993 | Germany . |
| 4338536 | 5/1995 | Germany . |
| 5178162 | 7/1993 | Japan . |

OTHER PUBLICATIONS

G. Spur: "Fuegen, Handhaben und Montieren". In: Handbuch der Fertigungstechnik, vol. 5, 1986, Carl Hanser Verlag Muenchen Wien, pp. 34–42, no translation.

*Primary Examiner*—Harold J. Tudor
*Attorney, Agent, or Firm*—Spencer & Frank

[57] ABSTRACT

A gas generator for passive restraint systems in motor vehicles. The generator includes a lower shell part having a cylindrical inner wall and a cylindrical outer wall coaxial with the cylindrical inner wall, the lower shell part further including first mechanical latch elements disposed on each of its inner wall and outer wall. An upper shell part of the gas generator has a cylindrical inner wall and a cylindrical outer wall coaxial with the cylindrical inner wall, the upper shell part further including second mechanical latch elements disposed on each of its inner wall and outer wall. The upper shell part is assembled with the lower shell part such that the first mechanical latch elements and the second mechanical latch elements are latched to one another. In an assembled state, cylindrical inner walls and cylindrical outer walls of respective ones of the lower shell part and upper shell part are coaxial with one another for forming an annular combustion chamber between the lower shell part and the upper shell part. Cylindrical inner walls of respective ones of the upper shell part and lower shell part further form an ignition chamber between the lower shell part and the upper shell part. An ignition unit is disposed in the ignition chamber.

9 Claims, 4 Drawing Sheets

GAS GENERATOR

This application is a continuation of application Ser. No. 08/532,224, filed Sep. 22, 1995 now abandoned.

FIELD OF THE INVENTION

The invention relates to a gas generator, and especially to a gas generator for passive restraint systems in motor vehicles, comprising a housing having several components to provide an ignition chamber and a combustion chamber.

BACKGROUND OF THE INVENTION

It is well known to provide restraint systems for vehicle occupants which are equipped with an airbag inflated by a gas which is in turn generated by a gas generator. Two main types of gas generators are known which use combustible, solid fuel-gas-generating compounds for inflating the airbag.

Firstly, DE 42 08 844 A1 describes a gas generator whose combustion and filter chambers are arranged annularly around an ignition unit and are made up of shell-shaped components. A shell-shaped lower part is joined by means of two threads to a shell-shaped upper part to make up the gas generator housing. The threads are used on the one hand to join together the cylindrical inner walls and on the other hand to join together the cylindrical outer walls of the upper part and lower part Because it is necessary that both these threads engage at the same time when assembling the gas generator housing, the permissible thread tolerances are extremely low as otherwise these threads would never fit together. As a further consequence, these extremely tight thread tolerances result in high production costs for the upper and lower parts. Another disadvantage of using threads is that, in order to lock them, and in order to seal the gas generator housing, locking means are required such as an adhesive, inserts, claws and pins.

Secondly, DE 43 38 536 A1 describes a gas generator of cylindrical design in which an elongated cylinder represents the combustion chamber and a cylinder enclosing this combustion chamber cylinder has outlet apertures. In this known gas generator, the combustion chamber cylinder is closed at its end face with a cover, the parts being joined again by a thread. The use of such a thread, however, results in the disadvantages mentioned above.

SUMMARY OF THE INVENTION

The object of the invention is to provide gas generators whose components can be joined together without the use of threads.

According to the invention, the components of the gas generator housing are provided with snap-in elements which interact in such a way that the components are connected by latching together.

In one embodiment of the gas generator in accordance with the present invention, the housing is made up of an upper part and a lower part, the inner and outer walls of the lower part have a first mechanical snap-in element and the inner and outer walls of the upper part have a second mechanical snap-in element. The snap-in elements are configured to interact in such a way as to latch together.

One embodiment of the cylindrical gas generator according to the invention also provides for connection of the cover with the combustion chamber cylinder by means of first and second mechanical snap-in elements which are configured to interact in such a way as to latch together.

In the first place, the use of a latching arrangement instead of a thread has the advantage that the gas generator components are cheaper to manufacture because the manufacturing cost of four threads is greater than that for the snap-in elements according to the invention. Also, the disadvantage having to monitor the torque applied and when fastening the bolts or screws in order to achieve the desired sealing effectiveness of the housing by the threads is eliminated.

Furthermore, by using the snap-in elements according to the invention, the overall height of the housing made up of an upper part and a lower part is always uniquely defined. The above advantage is not applicable when threads are used because, in that case, the overall height of the housing depends on the depth of the bolt or screw.

In addition, the use of snap-in elements makes it easier to assemble the gas generator according to the invention thus resulting in further cost advantages.

At the same time, the reject rate when assembling a gas generator made up of upper part and lower part is reduced because the four threaded parts used in state-of-the-art units do not match if there is the slightest fluctuation in tolerance.

In a further embodiment of the gas generator made up of an upper part and a lower part according to the invention, the ignition unit has a bead around its periphery that fits into an annular groove in the upper and lower part. Thus, assembly of the ignition unit is also easier compared with the use of threaded or orbital rivets.

In an advantageous embodiment of the cylindrical gas generator, the ignition unit is connected with the combustion chamber cylinder by means of a latch. The components are therefore simplified even further, which means that the components can be manufactured and also assembled at lower cost.

To seal the gas generators effectively according to the invention, provision has been made for sealing elements, particularly O rings, in the region of the snap-in elements.

In accordance with a further embodiment of the gas generator according to the invention, the mechanical snap-in elements are in the form of slotted latches that offer a spring action which ensures dependable functioning of the snap-in mechanism.

Finally, in another advantageous further development of the invention, a rotary bayonet latching arrangement can be provided as a latch.

BRIEF DESCRIPTION OF THE DRAWINGS

The invention will now be described and explained in more detail on the basis of the following drawings. The drawings show, in.

DESCRIPTION OF THE PREFERRED EMBODIMENTS

Figure 1:
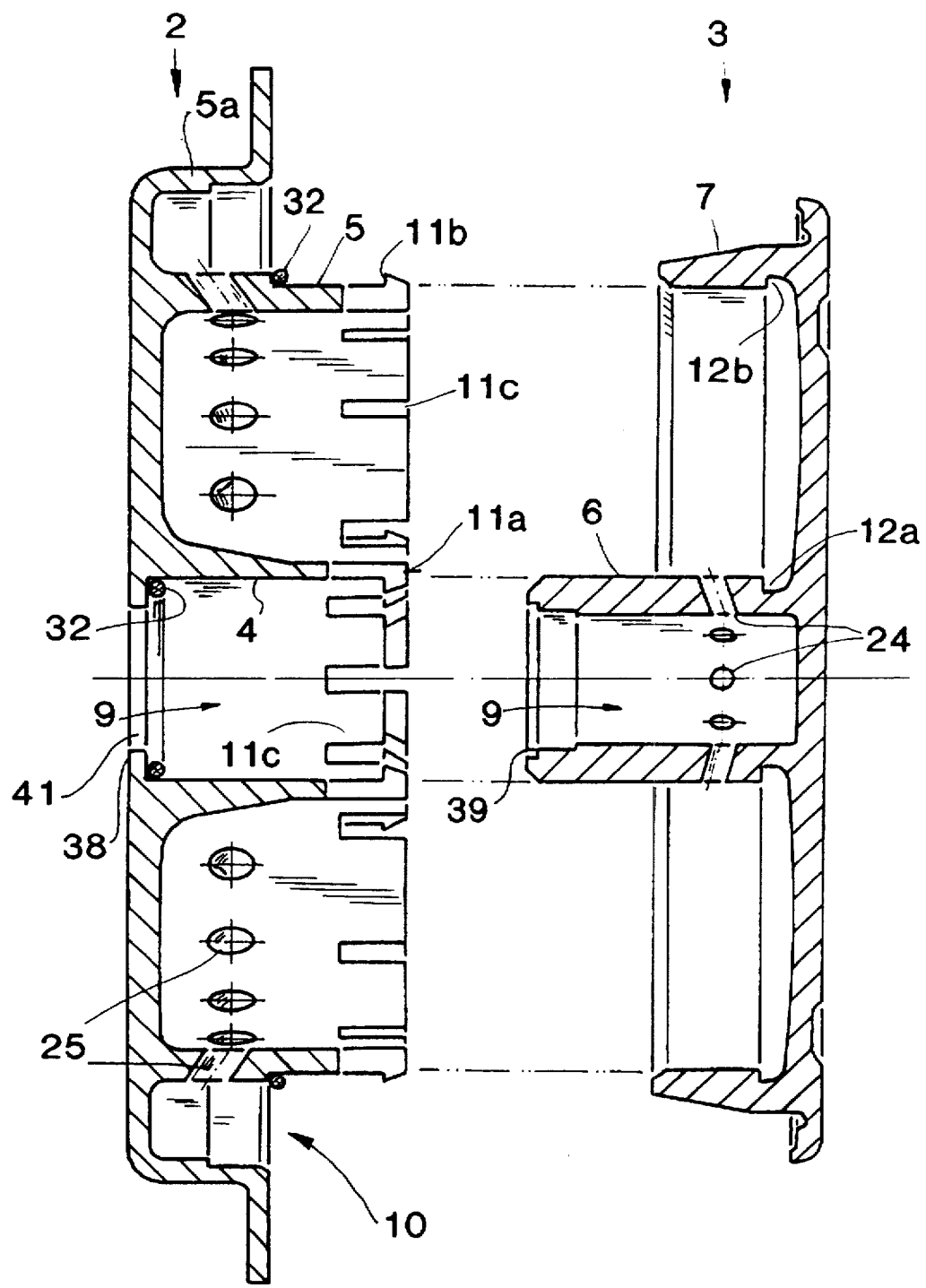
FIG. 1 a sectional view of an upper part and a lower part of a gas generator according to a first embodiment of the invention.

In the Figures, where like elements have the same reference number. FIG. 1 shows a lower part 2 and an upper part 3, each having circular symmetrical design. The lower part and upper part when assembled together, form a housing 1 in accordance with FIG. 2 for a gas generator which holds a gas generating substance 43.

Figure 2:
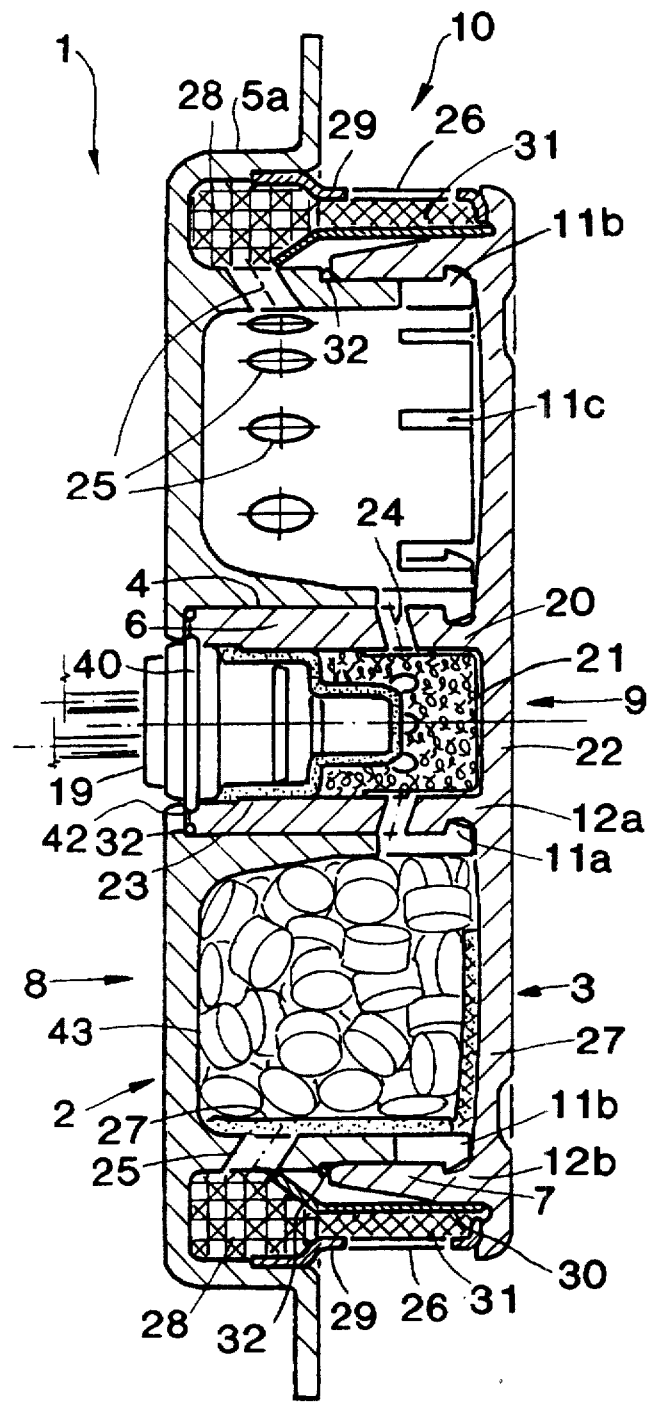
FIG. 2 a sectional view of an assembled gas generator in accordance with FIG. 1.

In accordance with FIG. 2, housing 1 contains a cylindrically shaped ignition chamber 9 to accommodate an ignition unit 19 and an ignition mixture 20. The longitudinal axis of this ignition chamber 9 forms the axis of symmetry of the rotationally symmetric housing 1. To accommodate the gas generating mixture in the form of tablets 43, a toroidal combustion chamber 8 is arranged around this ignition chamber 9. Finally, a further toroidal zone provides a filter chamber 10.

The above chamber system is made up from the upper and lower parts 2 and 3 as shown in FIG. 1, each of which is shell-shaped. The upper and lower parts 2 and 3 each have a cylindrical inner wall 4 and 6 respectively and a cylindrical outer wall 5 and 7 respectively, all being coaxial to each other. The inner walls 4 and 6 of the lower and upper parts 2 and 3 together form the ignition chamber 9 while the two outer walls 5 and 7 together form the outer boundary of the combustion chamber 8. Finally, the filter chamber 10 is formed by a filter chamber wall 5a flanged onto the lower part 2 and a part 29 shown in FIG. 2.

When assembling the two parts 2 and 3, the inner walls 4 and 6 as well as the outer walls 5 and 7 are pushed into each other concentrically which means that the outer diameter of the cylindrical inner wall 6 of the upper part 3 corresponds to the inside diameter of the cylindrical inner wall 4 of the lower part 2. The cylindrical outer walls 5 and 7 of the lower part 2 and the upper part 3 are designed similarly so that the outer wall 7 of the upper part 3 encloses the outer wall 5 of the lower part 2.

In order to obtain a secure connection between the lower part 2 and the upper art 3, these parts have snap-in elements. These snap-in elements are made up of nap-latches 11a and 11b situated at the outer edges of the cylindrical inner wall and of the cylindrical outer wall, respectively. The snap-latches are slotted (see reference number 11c) so as to provide a spring action. This spring action is necessary because when the lower part 2 and the upper part 3 are pushed together the latch elements 11a are loaded towards the outside and latch elements 11b towards the inside, so that when pushed together the latch elements 11a and 11b snap into recesses 12a and 12b, respectively in the upper part 3. The latch elements 11a and 11b are deflected by about 1.5 to 2 mm when the lower part 2 and the upper part 3 are pressed together.

In order to bring the ignition unit 19 (see FIG. 2) into the housing, the lower part 2 has an opening 41 in the base area of the ignition chamber 9 matching the diameter of the ignition unit 19. According to the state of the art, this ignition unit 19 is introduced as an orbital rivet after the upper and lower parts have been assembled, or it is fastened by means of a thread. In the present example as shown in FIGS. 1 and 2, however, the ignition unit 19 is fitted simply as described below. For this purpose, a circular ledge 38 is placed around the opening 41 in the base of the ignition chamber 9 of the lower part 2. Together with a circular step 39, which is situated at the edge of the cylindrical inner wall 6 of the upper part 3, this ledge 38 forms a circular groove when the lower part 2 and the upper part 3 are assembled. A bead 40 on the periphery of the ignition unit 19 is accommodated by this annular groove 42, so that a snug fit is obtained when the parts are fitted together.

To ensure that housing 1 is properly sealed, an O ring 32 is placed in the interior corner region of the ledge 38 as a sealing element. A second sealing O ring 32 is situated in a circular step arranged on the outer surface of the cylindrical outer wall 5 of the lower part 2. When assembled, the free end of the cylindrical outer wall 7 of the upper part 3 contacts the step provided with this O ring.

Before the lower part 2 and upper part 3 are joined together to form a complete housing 1 as shown in FIG. 2, the lower part 2 and the upper part 3 are each pre-assembled.

First of all, an aluminum sealing foil is placed in the combustion chamber 8 of the lower part 2 together with a coarse filter 27 which is arranged in the region of the outlet apertures 25 situated in the cylindrical outer wall 5. The gas-generating mass in the form of tablets 43 is then filled into the combustion chamber 8. Instead of using an aluminum sealing foil, these tablets 43 can also be introduced in an aluminum prepackaging of toroidal shape matching the combustion chamber. Furthermore, a volume compensator 37 is inserted which also acts as damping cushion.

The upper part 3 is preassembled by inserting an outer seal-casing 22 in the ignition chamber. Finally, the early-ignition powder 21 is filled into the chamber and then a separating film is pushed in. Now the main ignition powder is fed in, the ignition mixture 20 is metered in, and an inner seal-casing 23 is pushed in. Finally, the ignition unit 19, which contains the actual ignition pill with an ignition carrier, is also pressed in so that the bead 40 bears on the peripheral step 39.

The preassembled lower part can now be pressed together with the preassembled upper part 3, the snap-latches 11a and 11b pretensioning in the process. When the snap-latches 11a and 11b latch into the recesses 12a and 12b, the sealing elements 32 deform and remain deformed in the final state so that the required sealing effect is automatically assured.

The height of the housing 1 is now unambiguously defined by the latch mechanism and no longer depends on the screw-thread depth as in the case of gas generators of the prior art.

To complete the filter chamber 10, a metal wool 28 is placed in the region of the filter chamber wall 5a as a coarse filter, a guide plate 30 is installed with a fine filter 31, and finally a plate 29 with escape openings 26 is clipped in.

This gas generator 1 which is now finally assembled in accordance with FIG. 2 can now be joined to an inflatable airbag by means of a flange fixed around the filter chamber wall 5a, at the same time as being joined to the holder of a steering wheel in a motor vehicle.

Figure 2A:
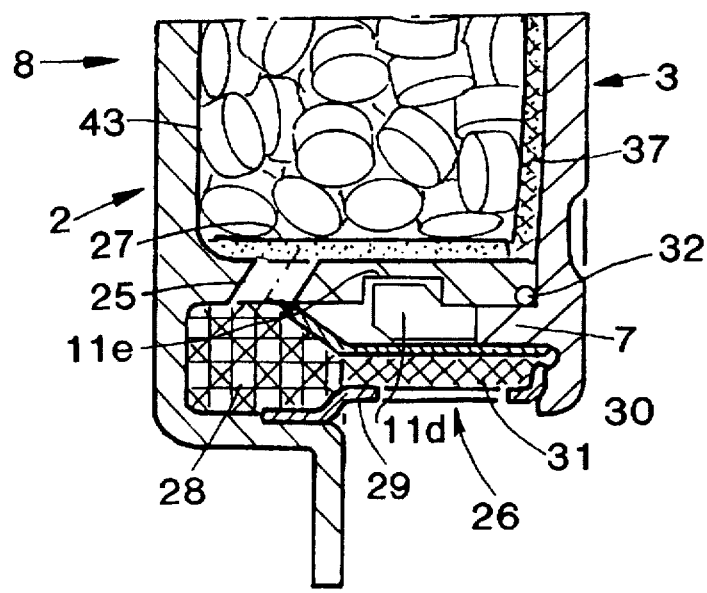
FIG 2a a sectional view of portions of an upper part and a lower part of the gas generator of FIG. 2 having an alternative latching arrangement.

The latching arrangement used in the above embodiment in accordance with FIGS. 1 and 2 can also be replaced by a rotary bayonet latching arrangement 11d, 11e, as shown in FIG. 2a.

The manner in which the gas generator in accordance with FIG. 2 functions will now be explained briefly. On detection of a crash, the electrical ignition unit 19 receives a signal to ignite the ignition mixture 20 as a result of which the outer and inner seal-casings 22 and 23 burst at a particular pressure in order to allow an ignition flame to spread into the combustion chamber 8 through the holes 24 provided in the cylindrical inner wall 6. This causes the tablets 43 to ignite and generate the required propellant gas which causes the aluminum sealing foil, or the prepackaging if such is used, to tear open and the propellant gas enters the filter chamber 10 through the outlet apertures 25 after passing through the coarse filter 27. These outlet apertures 25 are so designed as to direct the propellant gas from the combustion chamber 8 directly onto the metal wool 28 where liquid and solid particles are separated from the gas. Condensation of the liquid particles from the gas stream begins already at the coarse filter 27 which is located before the outlet apertures 25. When the propellant gas has encountered the metal wool 28, it is deflected by the guide plate 30 and taken to the fine filter 31. The propellant gas then enters the inflatable bag through the escape apertures 26.

Both the escape apertures 26 and the outlet apertures 25 can be sealed on the inside with a thin bursting film so that no moisture can get in from the outside.

For the housing 1 of the gas generator according to the invention as shown in FIGS. 1 and 2, aluminum is used as housing material.

Figure 3A:
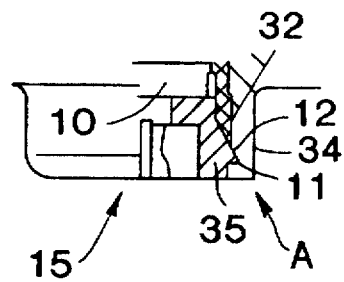
FIG. 3a a sectional view of a portion of the ignition unit used in the embodiment of FIG. 3 in an alternative seating arrangement.
Figure 3B:
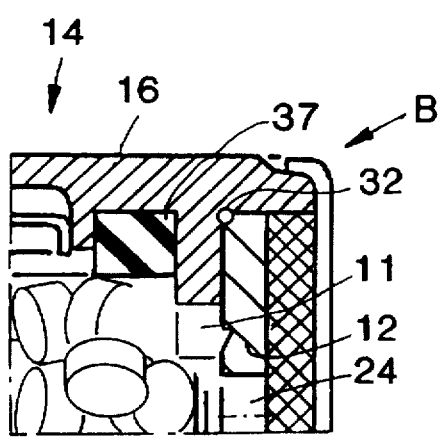
FIG. 3b a sectional view of portions of an upper part and a lower part of the gas generator of FIG. 3 having an alternative latching arrangement.
Figure 4:
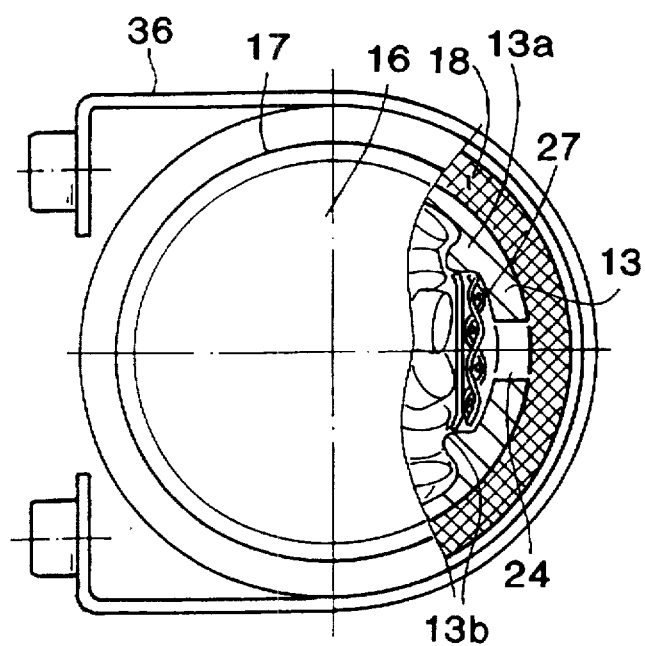
FIG. 4 a sectional view along line A—A of the gas generator shown in FIG. 3.
Figure 3:
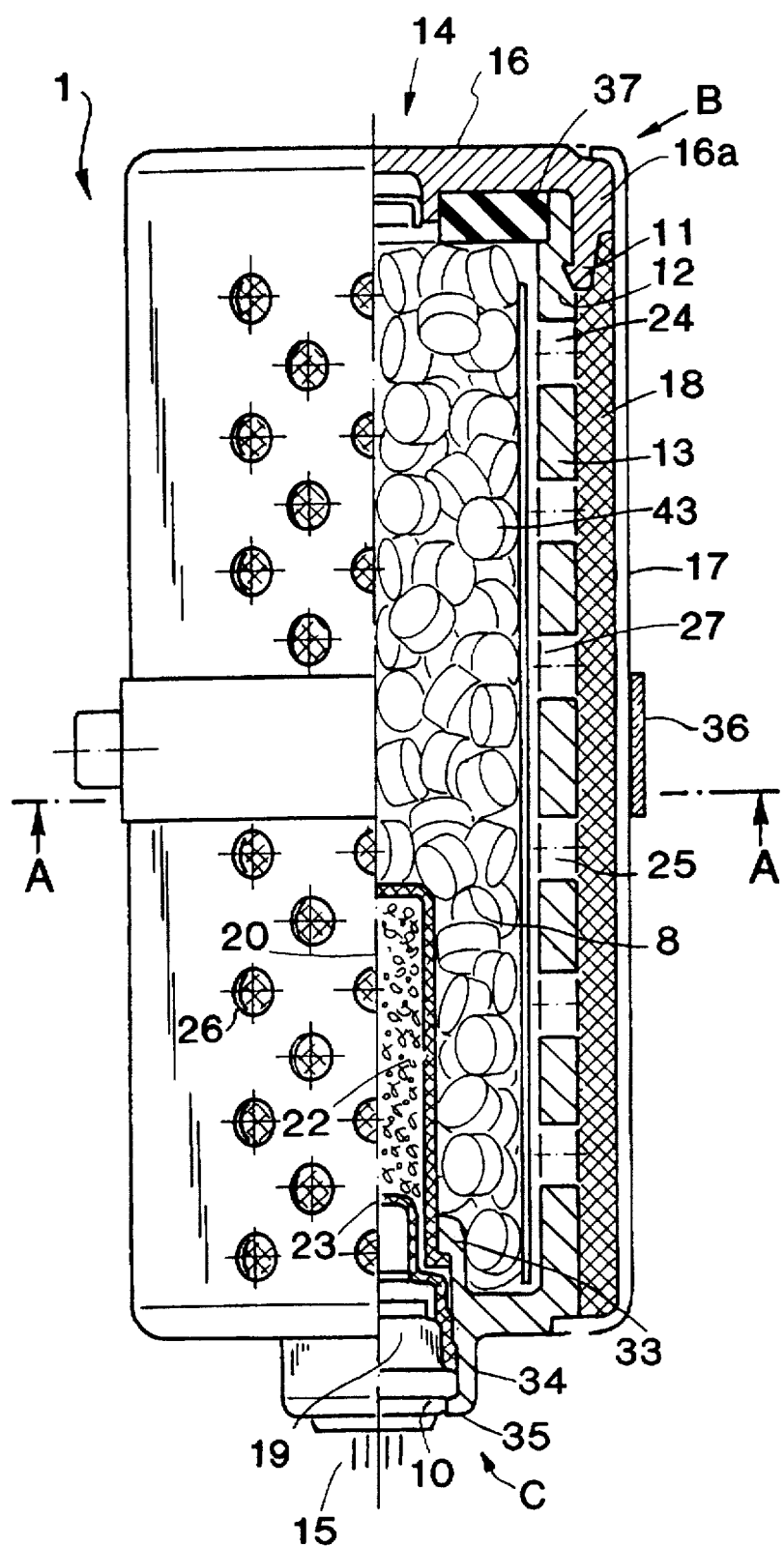
FIG 3 a sectional view of an upper part and a lower part of a gas generator according to a second embodiment of the invention having a cylindrical combustion chamber.

Turning to FIGS. 3 and 4, the gas generator as shown therein has an elongated cylindrical shape and includes the following parts: a combustion chamber, cylinder 13 which for the purpose of providing a combustion chamber 8 accommodates the gas generating fuel in the form of tablets 43, a cover 16 for closing the one face-end aperture 14 of the combustion chamber cylinder 13, an ignition unit 19 which projects through the other face-end aperture 15 of the combustion chamber cylinder 13 into the combustion chamber 8 and for closing the combustion chamber, an outer cylinder 17 enclosing the combustion chamber cylinder 13, and filtration means 18 being located in the space between these two cylinders 13 and 17.

The cover 16 has a circumferential rim 16a folded over the edge area at the aperture 14 of the combustion chamber cylinder 13, this edge zone 16a being provided with latches 11 which, when fitting the cover 16 over the aperture 14 of the combustion chamber cylinder 13, engages into recesses 12 located on the envelope of the combustion chamber cylinder 13. These snap-latches 11 are slotted for this purpose to provide the necessary spring action when engaging. To obtain the desired gas-tightness of the housing 1 a sealing element, for instance an O ring, is placed in the inside corner zone of the cover 16 before it is fitted.

Alternatively, as shown in FIG. 3b, the cover 16 can also be provided with latches 11 incorporated in the rims but which engage or latch into recesses 12 situated on the inner surface of the combustion chamber cylinder 13. In this version too, the latches 11 are slotted. An O ring 32 is also used here for sealing purposes.

Finally, the cover 16 can also be provided with two circumferential concentric rims 16a (not shown in the Figures), each having slotted latches 11. On introducing such a cover into the aperture 14 of the combustion chamber cylinder 13, the latches on the outer rim are pretensioned in the outwards direction and the latches on the inner rim in the inner direction and then engage simultaneously in recesses arranged both on the outside surface and on the inside surface of the combustion chamber cylinder. The result is a closure with particularly high gas-tightness.

The second face-end aperture 15 of the combustion chamber cylinder 18 has a smaller diameter than the combustion chamber cylinder and is matched to the diameter of the ignition unit 19. In order to fasten this ignition unit 19 in the combustion chamber cylinder, both an inner flange 33 and an outer flange 34 is provided in the edge zone of aperture 15. Thus, the inner flange 33 has an internals stop for an external seal-casing 22. An internal seal-casing 23 is pressed in through the cylindrical space, formed by the inner and outer flanges 33 and 34 and is seated on a shoulder provided in the outer flange 34. Finally, the ignition unit 19 including an ignition pill and igniter carrier and a plug element 35 is inserted and is firmly attached by a bead on the outer rim of the outer flange 34 (cf. reference symbol C)

To ensure firm seating of the ignition unit 19, a latch closing mechanism as shown in FIG. 3a can also be used in place of the bead A. The plug element 35 is provided with a circumferential latch 11 for this purpose so that when the ignition element 19 is inserted with the plug element 35 this latch 11 engages in a recess 12 situated in the region of the outer flange 34. To make sure the required gas-tightness is obtained, a sealing element, such as an O ring 32 for example, is provided in the region of this recess 12. In order to obtain a spring action when introducing the ignition element 19, the region of the plug element carrying the latches 11 can be provided with slots.

The method by which the gas generator functions will now be described briefly with reference to FIGS. 3 and 4. When the ignition unit 19 has received an electrical signal to ignite the ignition mixture 20, this ignition mixture 20 is ignited and consequently the propellant substance 43 for generating a propellant gas is also ignited. This propellant substance 43 is contained in the combustion chamber cylinder 13 in the form of tablets, and volume compensating material 37 is also provided.

The propellant gas generated by the tablets 43 flows first of all through a coarse filter 27 situated in the inner wall zone of the combustion chamber cylinder 13.

This coarse filter 27 is situated only in the region of the gas apertures 24 in the combustion chamber cylinder 13, as can be seen from FIG. 4. To fasten this coarse filter 27, two elevations 13a and 13b projecting into the interior of the combustion chamber cylinder 13 are used to allow the coarse filter to be clipped in between these two elevations. After the propellant gas has passed through the gas apertures 24, it encounters the tubular filter 1B and then passes through escape apertures 26 in the outer cylinder 17 and into an airbag that is not shown in the drawings. This outer cylinder 17 is joined by the beads B and C to cover 16 and combustion chamber cylinder 13 respectively.

To fasten the gas generator in accordance with FIGS. 3 and 4, a clip placed over half a side of the outer cylinder 17 is provided and to which the connecting pieces are flanged.

The tube generator shown in FIGS. 3 and 4 comprises a combustion chamber cylinder 13 made of aluminum and an outer cylinder 17 formed from steel sheet. The cover 16 equipped with the latching means is also made of aluminum.

What is claimed is:

1. A gas generator for passive restraint systems in motor vehicles comprising:

a lower shell part having a cylindrical inner wall and a cylindrical outer wall coaxial with the cylindrical inner wall, the lower shell part further including mechanical snap-in first latch elements disposed on each of its inner wall and outer wall, the first latch elements comprising slotted latch means including a plurality of latches disposed on circumferential edges of the inner wall and outer wall of the lower shell part, the latches defining a plurality of axially extending slots therebetween;

an upper shell part having a cylindrical inner wall and a cylindrical outer wall coaxial with the cylindrical inner wall, the upper shell part further including mechanical snap-in second latch elements disposed on each of its inner wall and outer wall, the upper shell part being assembled with the lower shell part such that the first latch elements and the second latch elements are securely latched to one another for forming a latching connection between the lower shell part and the upper shell part, wherein, in an assembled state:

cylindrical inner walls and cylindrical outer walls of respective ones of the lower shell part and upper shell part are coaxial with one another for forming an annular combustion chamber between the lower shell part and the upper shell part; and cylindrical inner walls of respective ones of the upper shell part and lower shell part further form an ignition chamber between the lower shell part and the upper shell part;

an ignition unit disposed in the ignition chamber; and sealing elements disposed between the lower shell part and the upper shell part for sealing the combustion chamber and the ignition chamber.

2. The gas generator according to claim 1, wherein:

the ignition unit includes a bead on a periphery thereof;

at a base region of the ignition chamber:

the lower shell part defines an aperture receiving the ignition unit therein and further includes a circumferential ledge at an edge region of the aperture; and the upper shell part includes a circumferential step at an edge region of the cylindrical inner wall thereof, the circumferential ledge and the circumferential step together forming an annular groove, the bead on the periphery of the ignition unit fitting into the annular groove.

3. The gas generator according to claim 1, wherein the second latch elements comprise recesses.

4. The gas generator according to claim 1, wherein:

one of the first and the second latch elements comprise latch hooks;

another one of the first and the second latch elements comprise recesses configured to latchingly receive the latch hooks therein for effecting a secure latching of the latching elements to one another for forming a permanent latching connection between the lower shell part and the upper shell part.

5. The gas generator according to claim 1, wherein the slotted latch means is configured such that the latches deform, with respect to an non-assembled state of the lower shell part, during assembly of the upper shell part with the lower shell part.

6. The gas generator according to claim 5, wherein the first latch elements and the second latch elements are configured such that:

the latches disposed on circumferential edges of the inner wall of the lower shell part deform in a direction away from an axis of the inner wall; and the latches disposed on circumferential edges of the outer wall of the lower shell part deform in a direction toward an axis of the outer wall.

7. The gas generator according to claim 1, wherein:

the first latch elements disposed on the outer wall of the lower shell part comprise latch hooks extending laterally and facing away from an axis of the cylindrical outer wall;

the first latch elements disposed on the inner wall of the lower shell part comprise latch hooks extending laterally and facing toward an axis of the cylindrical inner wall; and the second latch elements comprise recesses configured to latchingly receive the latch hooks therein for effecting a secure latching of the latching elements to one another for forming a permanent latching connection between the lower shell part and the upper shell part.

8. The gas generator according to claim 1, wherein the sealing elements comprise:

a first sealing element disposed at a region of the outer walls of the respective ones of the upper shell part and the lower shell part; and a second sealing element disposed at a region of the inner walls of the respective ones of the upper shell part and the lower shell part.

9. The gas generator according to claim 1, wherein the sealing elements deform, with respect to an non-assembled state of the lower shell part, during assembly of the upper shell part with the lower shell part, and stay deformed in an assembled state of the gas generator for assuring a sealing of the combustion chamber and the ignition chamber.

* * * * *